US005602970A

United States Patent [19]

Janser

[11] Patent Number: 5,602,970

[45] Date of Patent: Feb. 11, 1997

[54] PROCESS FOR SETTING THE HALFTONE DOT SIZES FOR A ROTARY OFFSET PRINTING MACHINE

[75] Inventor: Herbert Janser, Bolligen, Switzerland

[73] Assignee: Maschinenfabrik Wifag, Bern, Switzerland

[21] Appl. No.: 855,436

[22] Filed: Mar. 23, 1992

[30] Foreign Application Priority Data

| | | | |
|---|---|---|---|
| Mar. 21, 1991 | [DE] | Germany | 41 09 307.0 |
| Mar. 20, 1992 | [DE] | Germany | 42 09 165.9 |

[51] Int. Cl.$^6$ .......... G06F 15/00

[52] U.S. Cl. .......... 395/109; 395/114

[58] Field of Search .......... 395/109, 104, 395/128, 114, 118, 129; 358/80, 106, 107, 268, 460, 298; 382/111, 112, 266; 364/526

[56] References Cited

U.S. PATENT DOCUMENTS

| | | | |
|---|---|---|---|
| 4,200,932 | 4/1980 | Schramm et al. | 364/519 |
| 4,349,279 | 9/1982 | Jung | 356/402 |
| 4,414,636 | 11/1983 | Ueda et al. . | |
| 4,421,026 | 12/1983 | McCullion, Jr. | 101/136 |
| 4,468,692 | 8/1984 | Yamada et al. . | |
| 4,649,502 | 3/1987 | Keller et al. | 364/519 |
| 4,660,159 | 4/1987 | Ott | 364/526 |
| 4,660,470 | 4/1987 | Kramp et al. | 101/426 |
| 4,665,496 | 5/1987 | Ott | 364/526 |
| 4,680,646 | 7/1987 | Iueda et al. | 358/298 |
| 4,719,506 | 1/1988 | Van Buven | 358/80 |
| 4,795,281 | 1/1989 | Ulinsui, Sr. et al. | 400/74 |
| 4,814,797 | 3/1989 | Haneda et al. | 346/157 |
| 4,843,379 | 6/1989 | Stansfield . | |
| 4,852,485 | 8/1989 | Brunner | 101/211 |
| 4,985,779 | 1/1991 | Gall | 358/298 |
| 5,019,472 | 5/1991 | Benacu et al. | 430/43 |
| 5,079,132 | 1/1992 | Mitsui et al. | 430/359 |
| 5,181,257 | 1/1993 | Steiner et al. | 382/17 |

FOREIGN PATENT DOCUMENTS

| | | | |
|---|---|---|---|
| 2064113 | 11/1980 | United Kingdom | G01J 3/46 |
| 2165801 | 11/1984 | United Kingdom | B41F 33/00 |

*Primary Examiner*—Edward L. Coles, Sr.
*Assistant Examiner*—Gabriel I. Garcia
*Attorney, Agent, or Firm*—McGlew and Tuttle

[57] ABSTRACT

The present invention pertains to a process for setting the halftone dot sizes for a rotary offset printing machine, in which average set values based on production technical situations are predetermined for the halftone dot sizes of the printing block, the printing characteristics of the rotary offset printing machine are detected, and compensation measures are introduced in the case of deviations in the printing characteristics from set values; in order to improve the reproduction accuracy, the average set values of the halftone dot sizes are varied in the manner of inking system for setting the individual inking systems of the rotary offset printing machines in the preparation of the printing block, taking into account the deviation trends of the evidenced printing characteristics; as an alternative or in addition, color separation images of the printed original are displayed on the image screen of a color simulation computer; the halftone dot sizes of the color separation displays on the image screen are varied within predetermined tolerances and based on reviewed printing characteristics data of past productions; and the rotary offset printing machine is controlled corresponding to the tolerance sensitivity of the printed original.

12 Claims, 1 Drawing Sheet

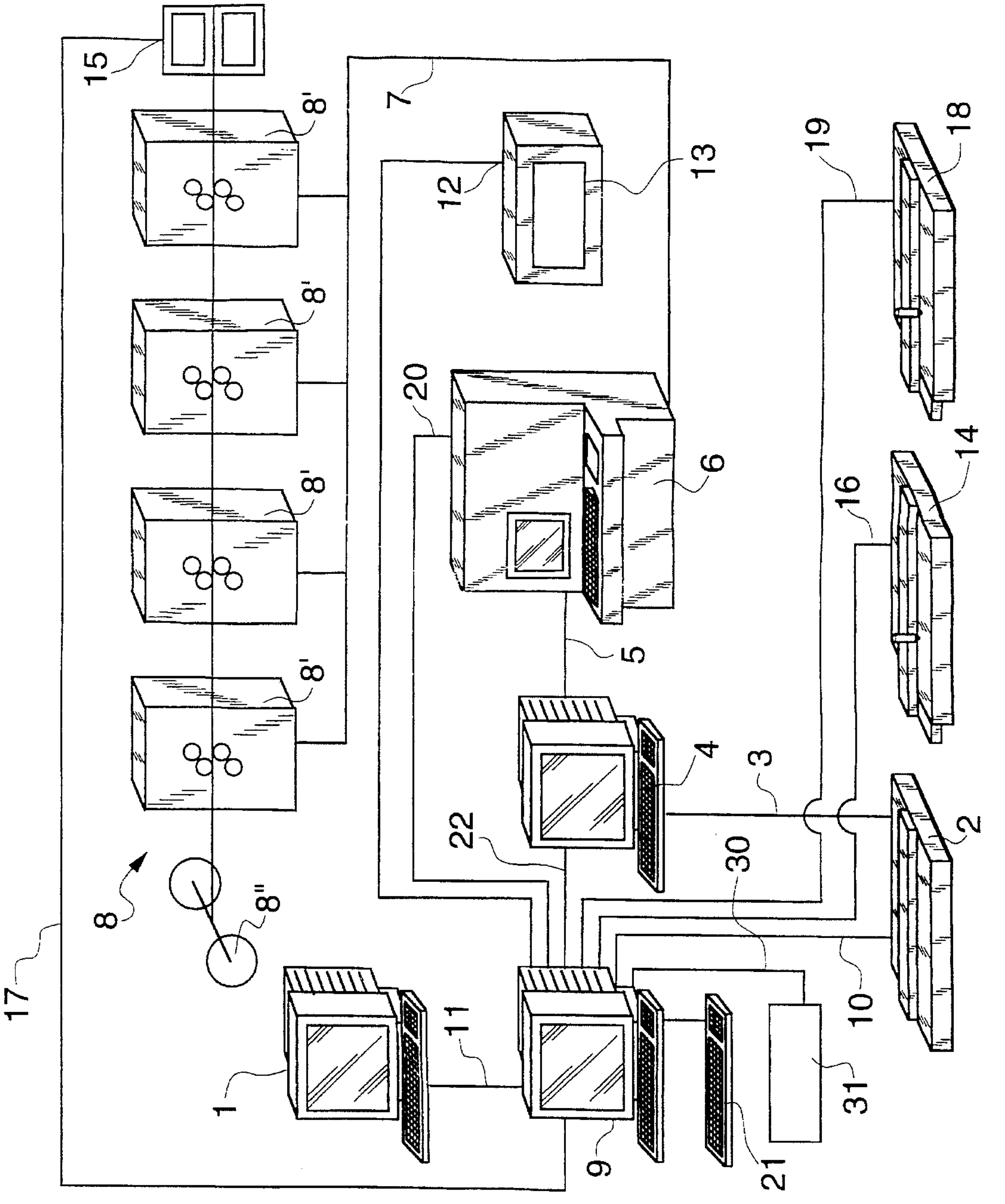
1
2
3
4
5
6
7
8
8'
8''
9
10
11
12
13
14
15
16
17
18
19
20
21
22
30
31

PROCESS FOR SETTING THE HALFTONE DOT SIZES FOR A ROTARY OFFSET PRINTING MACHINE

FIELD OF THE INVENTION

The present invention pertains in general to a process for setting the halftone dot sizes for a rotary offset printing machine, and more specifically to a process in which average set values based on production technical situations are predetermined for the halftone dot sizes of the printing block, the printing characteristics of the rotary offset printing machine are detected, and compensation measures are introduced in the case of deviations in the printing characteristics from set values.

BACKGROUND OF THE INVENTION

Attempts have been made for many years to improve, and especially to automatize, the setting and control of the essential operating parameters, especially color setting, of printing machines. Typical examples of the corresponding efforts emerge from patents GB-OS 2,165,801, DE-OS 33,14,333, DE-OS 38,06,100, DE-OS 37,35,785, DE-OS 39,29,085, DD-PS 236,292, DD-PS 256,291, GB-OS 2,064,113, DE-PS 32,04,501, DE-OS 37,30,625 and EP-PS 61,596.

In these cases, essentially measurement and control elements which are dependent on the printed original are used. In order to make possible an exact as possible effect of the color control per color point zone of the printing machine, these measurement and control elements are combined into one setting for each color point zone and into so-called control strips over the printing width. These strips are arranged outside of the printing image in the "white" edge of the printed sheet. These control strips are scanned either on-line, that is, directly in the running printing machine, or off-line on the material to be printed, i.e., printing samples are examined outside of the printing machine, so that corresponding adjustments can then be made.

However, the use of measurement and control elements that are dependent on the printed original have the disadvantage that, by this means, no immediate connection with the tolerance-sensitive image points of the printed originals can be achieved. Consequently, more control elements are used per printed page than would be actually necessary, and there are also no set values for these elements which are specific to the printed original. In addition, the management of measurement and control elements necessitates not inconsiderable expense for the printing block preparation.

For eliminating these shortcomings, various suggestions have now been made in order to determine, directly from the printing format, the factors which are decisive for quality, especially halftone dot size and full-tone density, without specific control strips.

EP-OS 0,136,642 deals with a process for determining the full-tone density and the point increment on two three-color, halftone elements by means of densitometric measurements, calculation formulas and calibration curves. This process is very expensive and is realized in practice only with extremely great expenditure.

Further, from DE-OS 39,25,011 emerges a process for checking the printing quality of multi-colored printed originals of an offset printing machine, in which, with the aid of a camera with color-selective sensor fields, color separation images of the image segment to be examined are produced in the spectral regions red, green and blue, and the color separation images are processed by means of methods of image analysis in an image processing system, such that the color layer thickness of the color halftone dots of the individual primary colors can be determined via a halftone measurement. This process takes into account the desired average color halftone dot density in the measurement segment, but does not consider the tolerances permissible based on the perceptibility of the human eye.

DE-OS 28,29,341 deals with the data entry for color control units, in which a manual densitometer is connected to a color control unit. For the simplification of operation, a user guidance is provided by a display device connected to the densitometer. With the manual densitometer, measurements can be made on a printed sheet in freely selectable image zones, which are adapted to the subject. Since the measurement points can be located in the image area, the above-mentioned color control strips are unnecessary. However, it is not described how these image zones and their appropriate set values are determined.

The process of pulling printed sheets for random samples with regard to process parameters which are decisive for quality, taking measurements, and with the aid of the results found, carrying out point operations according to the usual methods of control and regulation technique is known from DE-OS 2,728,738.

Further, from U.S. Pat. No. 4,468,692 emerges a process for varying the colors of an image, in which density signals for the colors cyan, magenta, yellow and black, which are taken from the original, are supplied to the color display. Color signals for cyan, magenta and yellow are converted by using tabular memories in color separation density signals for red, green and blue, the converted color separation density signals are then individually added.

Subsequently, correction values for the printing of the colors, which are obtained from a second tabular memory depending on the color signals, are added superimposed to the added color separation density signals. A correction value for the printing of black onto the other colors, which is read out from a third tabular memory, can be added to the signals received in this manner.

Further, DE-OS 33,19,941 demonstrates a process for the display of a color image simulating a multi-color printing on a display screen in which data, which is determined for the production of a multi-color printing, is polled from a memory device and is selectively added for all printing colors, that is, for the production of a density signal, which, after its processing, controls a color kinescope for the display of the color image simulating the multi-color printing.

U.S. Pat. No. 4,414,635 demonstrates a color control simulator, in which a variation of the various color signals can be made by means of tabular memories.

From U.S. Pat. No. 4,843,379 is known a monitor for the reproduction of color images, in which the saturation of image colors is affected by means of a predetermined algorithm, while the color tone and the color intensity remain unaffected.

Japanese Patent Application 1-131,568, published in *Patent Abstracts of Japan*, P-922, on Aug. 22, 1989, vol. 13/No. 377, demonstrates a printing simulator, in which signals are digitally processed and stored for the colors yellow, magenta and black. The output signals of the memory are switched such that the signals read out are displayed half in horizontal lines and half in vertical lines.

Therefore, for example, two images can be displayed by two memories at the same time and can be compared to one another on the display screen of the color monitor.

Further, an attempt has already been made to analyze and arrange the permissible tolerance as a function of the printed original. In this regard, DE-OS 35,43,444 describes a process, in which halftone dot sizes, possibly even full-tone densities, are determined on measurement fields printed together within the color zones, and with the dropping out of same, the printing process is engaged from tolerance ranges assigned to them, correcting by actuation of final control elements. In this case, each printing job is classified by means of a catalog of typical test images and color tables into an image contrast class. Based on the classification into this class, the tolerance to be observed can subsequently be set. Thus, the corresponding set values apply to the image-independent, standardized control elements for full and matrix densities. However, this process has the following disadvantages: For each printed original, a test image, must first be sought and found; if, with the aid of this test image, it turns out that the tolerance scope is too narrow for the printing process provided, it is difficult to estimate how the printed original reacts upon "outbidding" the tolerances specific to the printing process, that is, when the limits of the tolerance range are reached. In addition, this process does not take into account the different multi-colored superstructures of the color separations, and finally, it is very expensive if the printed originals must be classified with reference to different color zone sensitivities.

A further development of this process is described in DE-OS 36,04,222, according to which measurement fields are formed in selected color zones in the form of combination measurement fields, For this purpose, single color measurement fields of at least two different printing colors are printed superimposed in order to be able to reduce the number of measurement elements per color zone in the control strips. Corrected values for the full-tone densities and/or halftone dot sizes are obtained from the measured values determined in these combination measurement fields. The inclusion of the permissible tolerance range and the prior checking of the effects of fluctuations of the operation parameters in this tolerance range are not visually possible.

SUMMARY AND OBJECTS OF THE INVENTION

The basic task of the present invention is to create a process for setting the halftone dot sizes for a rotary offset printing machine, in which the above-mentioned disadvantages do not occur. A process, which makes a true-to-nature reproduction even of complicated printed originals possible, is especially suggested.

According to a first aspect of the invention, this task is solved in a process for setting the halftone dot sizes for a rotary offset printing machine, in that the average set values of the halftone dot sizes are adjusted in the preparation of the printing block and/or in the presetting of the rotary offset printing machine, taking into account the deviations in the printing characteristics evidenced per inking system.

This solution aspect is based on the following considerations. In the presetting and control of the ink/water equilibrium of a rotary offset printing machine, systematic deviations of the actual values of the operation parameters decisive for quality, especially the halftone dot sizes, can occur. Thus, the halftone dot size presented itself as an especially essential parameter, which provides a decisive contribution to the image.

For the corresponding setting of a rotary offset printing machine, standards for the newspaper printing process, e.g., according to UGRA 73/11, are predetermined. According to which, for example, a printing block is prepared. The halftone dot size also represents an essential parameter of this standard. URGA being a membership group of "The International Association of Research Institute for the Graphic Art."

According to the usual process, the printing block is prepared with consideration of these standards, by means of which deviations in the so-called "printing characteristics" are then produced in the actual printing. These deviations consist of the differences between the process printing characteristic mean values according to the standard and the actual printing characteristics per inking system. That is, statements about the actual printing and the systematic deviations from the standard values, especially in the tone value increases, occurring in this case.

As long as the actual mean values are not known for the printing characteristics per inking system in the operating range of the "printing preliminary stage", the color separations and page make-up must be processed with the predetermined characteristic mean values of the newspaper printing process, for example, according to URGA 73/11.

If one now, shortly before the preparation of the printing block, retrieves, via the document plan, the actual mean values of the half-tone dot sizes for the individual inking systems, then the deviations between the set values and the actual values of the halftone dot size can still be taken into account in the printing block preparation. With this procedure, tons-value-shifting differences between the individual colors can be limited already before running the rotary offset printing machine. Thus, it is, of course, required that, in each case, the color mean values lie within the process tolerance.

In this manner, therefore, systematic, machine-related deviations between set values and actual values for the halftone dot size can be detected and compensated for, whereby, according to a preferred embodiment, the average set values of the halftone dot sizes are adapted to one another while taking into account the anticipated actual changes during production and the relationships of the inking systems specific to the printed original.

According to a second aspect of the present invention, color separation images of the printed original are displayed on the display screen of a color simulation computer. The halftone dot sizes of the color separation display on the display screen are varied within predetermined tolerance and based on reviewed printing characteristics data of past productions; the rotary offset printing machine is controlled corresponding to the tolerance sensitivity of the printed original.

In this manner, random errors can be compensated for these errors occur in the offset printing due to the numerous sensitive relationships and variables. In printing, the flawless printed image depends on the ink/water equilibrium, which independent of the type of inking system, must always be formed a new for each printing block. Since numerous incident factors impair the constancy of this equilibrium and cause random errors, a control, whether it be manual or automatic, is always necessary in high-quality demands.

It is know form DE-OS 35,43,444 and DE-OS 36,04,222 that fluctuations of the tone values are primarily perceived as color balance deviations in the medium tones. From this it follows that an optimum control should not exclusively correct the individual colors independently of one another, but rather should take into account the relationships of the colors to one another. In addition, since the sensitivities to the deviations of tone value shifts depend highly on the image original, very different requirements which are dependent on the printed original result for the tolerance for the individual colors and their relationships to one another. In order to quickly transfer these requirements in the sense of a control process, the present invention uses a color simulation computer, on which color separation images of the printed original are displayed.

On the image screen of this color simulation computer, the image to be analyzed, for example, a newspaper page, can be checked for its deviation sensitivities, while the halftone dot sizes of the color separation displays are varied within predetermined tolerances. Appropriately, this image affect is made in an analogous manner as on the rotary offset printing machine, namely, analogously to the color zones and in a helping manner with corresponding entry keyboards.

In a first serial-model modification, this process can take place purely manually and basically without connection to the rotary offset printing machine, especially when the machine already has optimum setting values for the start of production, for example, based on the first solution aspect. Therefore, in this serial-model modification, the color simulation computer would only serve as a "lead trainer" for the printer, in order to give it a feeling as to how it should behave in the case of the occurrence of random deviations.

For this purpose, both the reference original as well as the test image should be displayed on the image screen for the deviations, since a comparison between images cannot take place very exactly on paper and on the image screen, and in addition, cannot be carried out flawlessly under lighting technical conditions.

Since the image analysis takes place on the basis of a relative variance comparison, this is not absolutely a disadvantage; in particular, the image screen comparison allows the rapid and rational execution of numerous deviation combination possibilities.

In contrast, if one wishes to have ready reference preset values for the direct cross comparison with the printed copy for the variance comparison in the printing, then this would have to be issued via a suitable, high-resolution printer, so that a precise cross comparison is possible under normal lighting conditions.

The corrective measures worked out in this serial-model modification can advantageously be stored with control strategies operating according to fuzzy, or inexact, logic, such as "fuzzy Logic", and be used for the automatic control of the rotary offset printing machine. By this means, an essential relief of the printer results in the running operations on the rotary offset printing machine itself with the highest claims of quality.

In order to increase the accuracy even further here, in the case of the recording and evaluation of production data, the printer receives a timely warning via a checking of the tolerance when the automatized supported control has reached the limits of its possibilities.

For presetting the set values for the halftone dot sizes, possibly even for the full-tone densities, the conversion software of the main simulation computer is used, which can alternately convert the subtractive process colors cyan-blue, magenta-red and yellow into the additive process colors purple-blue, orange-red and green. By this means, the printed originals can be relatively very accurately displayed in the sense of a visual reference preset value on a high-resolution image. The image data necessary for this can result via the color separations of the three subtractive process colors and black from the corresponding film and printing plates by means of a scanner or yet through the direct transfer of the image data from a color separation computer.

Printing faults, which undesirably change the surface cover of the screen image, can represent another problem. The changes in the halftone dot sizes connected with this can principally have two different causes, namely, irregularities in the color flow behavior, which can be affected up to a certain degree via the color guide final control elements of the rotary offset printing machine, and so-called "errors in developed image", which impair the printed image by errors in the association between paper and printing cylinder. This leads to deformations of the halftone dot as well as to changes in the halftone dot size. In order to clearly differentiate these two error possibilities, there are conventional control measurement strips via special analysis elements, which detect the so-called shifting and/or doubling of the halftone dots.

In the solution described here, since control strips are no longer used in the conventional sense, this analysis possibility also does not apply. For recording these faults, an electronic planimeter can be used, which detects the halftone dots individually and defines them according to size and shape by means of an image-data-processing system. By means of a variance comparison for the essential quality parameters, namely halftone dot size and possibly full-tone density and halftone dot shape, the possible causes of faults can be separated from one another, and countermeasures can thus be introduced.

It has presented itself as appropriate to use a color point simulation keyboard for the development of fault-elimination strategies and to provide it with a second series of operating entry keys which are oriented to the color point zones. This enables the parallel change of halftone dot sizes of two process colors or the simulation of the transfer from the set state into a faulty change and its correction. If these corrective possibilities are stored, then the system is available for typical image faults over a priority series of corrective suggestions.

To set the measurement technical set values, the mechanical halftone dot sizes can be directly predetermined on the electronic planimeter based on the printing characteristics, while for the halftone dot shape, reference must possibly be made to a library with samples which are dependent on screen processes.

To set the densitometric and/or spectrophotometric set values, but also as "hard copy" for the visual reference set values, a color printer can be connected to the color simulation computer, e.g., operating according to the electrophotographic process. Another alternative consists in the presetting of these values via computer. The basic setting of this color printer, as well as that of the image screen, can take place in parallel to the basic setting of the rotary offset printing machine by means of suitable test forms.

In the control of densitometric or spectrophotometric measuring devices and/or of the electronic planimeter for the recording of the actual values, one proceeds according to the priority series for image control zones, which is formed in the presetting of the set values.

The measures for the reduction of deviations between set values and actual values are arranged according to the management priorities, which are set in the presetting of the set values.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

The single figure is an overview of the individual components of the entire system.

DETAILED DESCRIPTION OF THE PREFERRED EMBODIMENT

Referring to the drawing, a color separation computer 1, generally provided in the reproduction department, splits up the originals into the color separations for the four process colors cyan, magenta, yellow and black. These should then be transferred to the printing blocks for the four process colors. Subsequently, the entire page to be printed is arranged with this information and the corresponding text in the page make-up. The color separation computer 1 is understood here synonymously with the color separation and page make-up system.

The page to be printed with the four color separations is supplied to the color simulation computer 9 via a data line 11 from the color separation computer 1. The color simulation computer 9 receives additional input signals via a color simulation keyboard 21, via a data line 16 from a densitometer or spectrophotometer 14, via a data line 19 from an electronic planimeter 18, via a data line 17 from an on-line measuring densitometer or spectrophotometer and/or electronic planimeter 15, via a data line 22 from an AVOR (production planning) computer 4, and via a data line 10 from a film or plate scanner 2.

The color simulation computer 9 is connected to the printing block preparation 31 via a data line 30.

In addition, the output signals of the color simulation computer 9 are supplied via a data line 20 to a control station 6 of the rotary printing machine 8 and via a data line 12 to a monitor 13, which, as a rule, is located in the vicinity of the control station 6. The printing machine 8 includes a supply roll device 8.

The film or plate scanner 2 is connected via a data line 3 to the AVOR (production planning) computer 4, which supplies additional input signals to the control station 6 via a data line 5.

The control station 6 serving as rotary control, via a data line 7, triggers the final control elements (not shown) to be admitted into the individual printing units 8' of the rotary offset printing machine.

Thus, all decisive system elements for the entire system are schematically described, whereby it still should be mentioned that, in the data line network, the individual, bit-serial single connections can also be replaced by a universal BUS architecture with any data communication between the individual participants.

The mode of operation of this system will be described in detail below, and the parameters determining the image quality will be presently are discussed,. These parameters are decisive for carrying out the process in offset printing. In this case, it involves the color layer thickness, which is quantitatively described with the so-called full-tone density, and the halftone dot size which is quantified as a percentage of the color thickness cover. In the case of the halftone dot size, one differentiates between mechanical, that is, effective, and optic halftone dot size. The optic halftone dot size results from a measurement of the full-tone and screen densities by means of the so-called Murray/Davis formula. According to the Murray/Davis formula the optic halftone dot size is differentiated from the mechanical halftone dot size by the value of the so-called "light interceptor", which quantifies an optic light scattering phenomenon. For the purpose described here, this difference is only important insofar as the two percentages may not be confused with one another.

For the color metering in the offset printing, the corresponding color volume must be determined from the color layer thickness and the surface cover amount of all halftone dots and full-tone surfaces within a coloration zone. In this case, one basically proceeds according to the principle of the so-called standard inking. Accordingly, the contrast function is maximized for a certain inking system, a certain color recipe (color batch) and a certain paper. This contrast function is defined as the percentage density difference, related to the corresponding full tone, from full tone and halftone with ¾ film surface coverage, with given materials and printing ratios, the contrast maximum limits the coloration or the full-tone density upwardly insofar as, with a color layer thickness exceeding this, the halftone dots, especially in three-quarter tone, tend to approach and thus reduce the paper white content.

According to this principle, with given materials, the full-tone density is basically defined, such that the printing process can theoretically be controlled with the aid of the detection/checking of surface coverage and dot size. However, in practice, the relationship between full-tone density and halftone dot size is not constant, so that, in the printing process, halftone dot size and full-tone density must be checked; in this case, however, the full-tone density has a relevant, lesser importance than the halftone dot size.

A decisive attribute of these two quality-determining features are their respective tolerances. Through the decade-long efforts concerning the standardization in offset printing by various national and international institutions, tolerance data for the full-tone density and the halftone dot size have been indicated for various fields of application of offset printing. There are two problems in this regard: On the one hand, these tolerance data for the four process colors are made independent of the printed original, and on the other hand, the opposites of the closest tolerances possible and the economically justifiable expense connected therewith must thus be controlled.

Concerning the first problem, it is known that fluctuations of the halftone dot sizes and the color layer thicknesses are perceived as disturbances in the color balance, that is, of superimposed printing of the printing colors in the medium tones. In addition, the sensitivities to the deviations in the halftone dot sizes are very dependent on the image original; images with intense multiple colors and large multi-color contrasts reduce the sensitivity of the observer in this regard, whereas homogeneous gray surfaces with observation situations extremely devoid of contrast essentially increase the sensitivity of the observer, that is, even small changes in the halftone dot sizes are still perceived. As a result of this, it is necessary to analyze and to check the system-specific tolerances in relationship to the printed original.

For the color metering on the rotary offset printing machine, there are now basically two different types of inking systems available, namely, controlled slit inking systems oriented to color zones and short inking systems without color zones. These types of inking systems have specific advantages and disadvantages which, however, are not relevant for the present observations and consequently do not have to be discussed further. However, it is essential that the quality control system presented here can be optimally used for both types of inking systems.

In the controlled slit inking system oriented to color zones, the color metering is set, in the sense of standard inking, specific to the printed original on several color screws in corresponding color zones and corresponding to the color demand of the printed original over the printing width. In addition, in offset printing, the corresponding dampening must then still be set on the dampening system assigned to the inking system. Therefore, for setting and controlling the coloration on the slit inking system, final control elements which depend on the printed original must be actuated both on the inking system and on the dampening system.

In the short inking system without color zones, the color metering takes place in the sense of standard inking via a doctored halftone drum, basically independent of the printed original. Color control irregularities within the coating can practically not be influenced here, unless up to a certain degree by means of variable dampening. In the description of the mode of the system function below, the differences in the inking systems, operating oriented to zones and without zones, are indicated.

By means of the color separation computer 1, the originals in the reproduction department are split up into the color separations for the four process colors cyan, magenta, yellow and black. In this case, according to application and printed original, various principles can be used for the color arrangement, such as, e.g., "achromatic" or "undercolor reduction". Accordingly, the entire page to be printed with text and image is arranged in the so-called page make-up. Recently, this can take place in a completely computer-assisted manner, such that the printing technically relevant data of the pages to be printed are present in digital form and can be reproduced via the data line 11. In this sense, the computer 1 is schematically here acting as color separation computer and electronic batch system.

The pages thus prepared for printing with the four-color separations are then transferred into printing blocks (at 31). In an offset printing plate, this can occur, for example, by means of halftone films or according to a newer development by direct laser exposure of a light-sensitive plate layer with digitalized, stored halftone image data. These halftone image data are accurately determined in the reproduction department with regard to halftone fineness (lines/cm), halftone angle, halftone dot shape and halftone dot size. In the determination of the halftone dot size, the reproduction department must also beforehand compensate for the point increment typical for an offset printing process. For this purpose, the reproduction department needs from the printing machine room the corresponding, tolerance-containing set values (e.g., optic halftone dot enlargement in the medium tone 30±3%).

As should still be described, the color simulation computer 9 receives the current actual values in the form of printing characteristics from the offset printing machine. From these printing characteristics, one can derive systematic errors, which can be taken into account in the color simulation computer 9 when checking the average set values of the halftone dot sizes. The preparation of the printing block in the device 31, therefore, takes place with average set values for the halftone dot sizes, which take into account the deviations of the evidenced printing characteristics per inking system of the rotary offset printing machine.

The color simulation computer 9 is equipped with a conversion software, which can alternately convert the subtractive process colors cyan-blue, magenta-red and yellow into the additive process colors purple-blue, orange-red and green; by this means, the printed original is reproduced in the sense of a visual reference set value on the high-resolution image screen of the color simulation computer 9.

The image data necessary for this conversion from the color separations of the three subtractive process colors and black can be fed into the color simulation computer 9 by means of the scanner 2 from the corresponding films or printing plates. The direct transfer of the corresponding image data from the color separation computer 1 is another possibility. The second solution has the advantage that a quality control of the plate copy is possible by the comparison of the data on the data line 10 from the scanner 2 and on the data line 11 from the color separation computer 1. Thus, the accurate functioning of the plate exposure can especially be checked.

In order to insert an objective quality control, in addition to the "subjective" quality control, on the image screen of the color simulation computer 9 and to be able to accurately check the tolerances specific to the printing machine system, at least one more densitometer or spectrophotometer is provided, namely, either as an off-line system 14 or as an on-line system 15; the corresponding signals are fed to the color simulation computer 9 via the data line 16 or 17 as actual values for the quality control.

The on-line devices 15, scanning the printed paper on the rotary printing machine, operate considerably faster and fully automatize the quality control circuit, but have the disadvantage that they require at least one measuring head per path side to be checked and a uniaxial positioning device. In machines for multi-path productions, the on-line devices 15 are therefore very expensive.

Therefore, the following embodiments are limited to the application of off-line devices 14, which, in a simplest design, consist of a measuring table and a measuring device to be guided manually (densitometer or spectrophotometer). In this case, a direct measuring point location display by means of, for example, a point of light, is highly recommended.

An essentially more comfortable solution for the detection of the actual value for the quality control consists in the mounting of the measuring head, which operates densimetrically or spectrophotometrically, on an automatically controlled cross slide. The measuring point coordinates necessary per image, in this case, are predetermined directly by the software of the color simulation computer 9.

Especially if increased demands are made, still another detection device for the actual value of the quality control should be used, namely, an electronic planimeter 18. This device can scan the halftone dots of the individual process colors in the finished printing via corresponding optics and can describe their size and shape. The corresponding data are therefore fed to the color simulation computer 9 for variance comparison. A possibility that arises with this device especially worth mentioning is the checking and possibly the correction of the so-called color passer or color register. By this is meant the placing accuracy of the superimposed printed color separations to one another and on the printed sheet.

An advantageous embodiment of the devices 14 and 18 also consists in a combination of the corresponding measuring heads on only one cross slide unit.

Based on a deviation sensitivity analysis of the features determining quality, especially the halftone dot size, from the printed original by means of the color simulation computer 9, their critical image points with corresponding color compositions are investigated. This then forms the basis for the control and regulation strategy in the printing process. In a simple serial-model modification, if the quality control system does not have the measurement devices 14 and/or 18, then the "subjective" checking takes place via the reference set value on the monitor 13. However, for the measurement technical and automatized, assisted control, based on the deviation analysis, intended set values can be predetermined either in the printed image or in a digital wedge adapted specific to the original. In special cases, of course, a combined application of these techniques is also possible. The digital wedge consists of exactly determined control elements, especially for the halftone dot size and full-tone density, and said digital wedge can be stored in digital form in a computer. In the film or direct plate exposure, this digital wedge is then also transmitted onto the printing block. Thus, its elements can be components of the image or even be applied outside of the actual printed image on the white edge of the image. In the process described here, this digital wedge, with regard to composition, shape and arrangement of its control elements, can be optimally adapted to the printed original, on the one hand, and optimally to the color metering technique, on the other hand, and can be transmitted by the color simulation computer 9 to the film or plate exposure 31.

A special problem in the quality control is the collect-run production in double-cutting machines. In this type of production, two different printing blocks lie one behind the other on the same cylinder, such that the same color control final control elements act in their corresponding zones on printing blocks of originals with different requirements. This problem can be met effectively in that both originals are simultaneously examined for their tolerance sensitivity on the monitor of the color simulation computer 9 and correspondingly optimal set values and control elements are determined.

On further discussion of the flow of information and the various application possibilities of the quality control system represented here, the individual procedure steps are now schematically summarized below, that is, taking into special account the data feedback for checking and self-adapting the system.

1. The printing characteristics and the inking system basic settings are determined according to the principle of the standard inking mentioned. In this case, the dispersions occurring are averaged for the reproduction department. The tolerance band width of the printing characteristics is assembled from systematic and random, conditional deviations. An effort is now basically made to reduce the systematic deviations by following up the machine basic settings and preliminary settings and to control the random deviations in the printing process, if possible.

2. The color separations determined on the color separation computer 1 are transmitted to the color simulation computer 9. The color simulation computer 9 analyzes the deviation sensitivity of the printed original by means of intended size variation of the image-describing quality features, especially the halftone dot size. Based on this examination, control elements and corresponding set values are determined. Subsequently, the halftone dot sizes and the number of halftone dots are integrated to surface coverage totals over the printing length of the printing cylinder circumference, and these data are then fed to the AVOR computer 4, which, among other things, runs the so-called machine utilization programs. The programs offer information about the position of the printing block in the rotary offset machine, by means of which the assignment of the corresponding surface coverage totals to a specific unit of the printing machine 9 and to the inking value and dampening value are possible. These data are given via the data line 5 for the control of the rotary offset machine 8, which is schematically shown only as a control station 6. The machine control converts the surface coverage totals by means of calibration curves. These data are given via the data line 7 to the corresponding final control elements of the rotary offset machine 8. In addition to the inking systems, the dampening systems are also subsequently preset. To determine the calibration curves, the abovementioned principle of standard inking is applied.

In the inking system operating without color zones, one proceeds basically the same for the determination of the control elements and set values; however, the presetting process for the color screws is omitted. Only regulated quantities for the dampening systems can be transmitted here.

3. In running off single editions, the quality features according to the above image control zones and/or control elements are checked with the corresponding set values. In the case of undue deviations, either automatic corrections are made or corresponding predetermined values are transmitted to the printer. The printer then causes the predetermined corrections at the control stand 6 by input of corresponding set values for the final control elements. If the quantified recommendation does not reach the goal, the printer will overdrive these set values or else take other measures.

4. At the end of production, the predetermined and effective setting data are compared to one another, stored and periodically evaluated.

If there now result deviations in the surface coverage totals predetermined values with the corresponding effective setting values on the rotation and the same manual corrections occur in subsequent productions in the sense of systematic deviations at the start of or in the course of production, then the control can give the printer a recommendation for adapting the calibration curve or perform this action itself in the sense of a self-learning program, whereby with appropriate control elements, the contrast and the corresponding optimum full-tone density must be checked. It can be guaranteed with this mode of procedure that the band width of the systematic deviations can be gradually better limited.

In the short inking systems without zones, system-specific deviations also occur, that is, for example, due to other color batches or due to wear of the doctor blade and halftone drums. In order to control these deviations as much as possible in their effects, it is recommended to also carry out tolerance analysis depending on the printed original on the color simulation computer 9 with the determination of corresponding control elements and set values. If the checking results are now systematically evaluated and carried out according to the production, for example, with the AVOR computer 4, then these data can gradually also be taken into account in the image tolerance analysis, as they are relayed via the data line 22 into the color simulation computer 9. If, in this case, disturbing deviations are now detected, which deviations can no longer be corrected on these inking systems shortly before the beginning of production, then intended halftone dot size corrections must be forwarded by the color simulation computer 9 to the printing back preparation 31. This requires, of course, a progressive quality control system structure, in which the analysis of the original can be carried out in connection with the systematic inking system deviations before the plate exposure.

For improving the control action in inking systems operating oriented to color zones for reducing the band width of the random deviations, the changes in the surface coverage totals predetermined values and the setting values can be stored and analyzed upon completion of production, in order to derive control predetermined values therefrom, such as, for example, that halftone dot size corrections are made upwards more simply than downwards and/or, that second, third and fourth colors are set with more difficulty in the superimposed printing due to the color operating action. These controls can now be formed and run in the color simulation computer 9 based on the running production evaluations for gradual optimized automation.

In the short inking systems operating without zones, random deviations can also occur, that is, for example, associated with the room air conditions and/or the ink/water equilibrium influenced by the printing block. To correct such influences, one is disadvantageously restricted in these inking systems. However, there are still possibilities to make certain corrections in the production concerning the color temperature equalization or the intended change in the dampening. Thus, appropriate control strategies can also be developed in the short inking systems without zones with the quality control system described here.

5. The adjustment controls oriented to the machine discussed in the above section can now be combined on the color simulation computer 9 with the set values depending on the printed original and their relationships to one another into control strategies specific for production. To facilitate the development of these control strategies, the color simulation keyboard 21 is provided in the case of the color simulation computer 9, which keyboard, for example, simulates the zonewise change in the dot sizes in the color simulation computer 9 in exactly the same manner as the color screw adjustment on the control station 6 of the rotary offset machine 8. Appropriately, this simulation keyboard is provided with a second row of input keys operating oriented to color point zones. This makes possible the parallel change of halftone dot sizes of two process colors of the simulation of the transfer from the reference state into a disturbing change and its correction in different ways. By storing these correction possibilities, the system has a series of correction strategies available for typical image disturbances.

6. For especially particular and recurrent hues, such as skin, furniture or certain fashion colors, the optimum can be worked out by means of the control system specific for production from various color composition variants in relation to the reproduction accuracy and deviation stability and can be polled in the case of repeated demand.

I claim:

1. A process for setting halftone dot sizes for a rotary offset printing machine, the process comprising the steps of:

determining average set values for the halftone dot sizes of a printing block based on past productions;

detecting printing characteristics of the rotary offset printing machine;

introducing compensation measures if said printing characteristics deviate from said set values;

adjusting the average set value of the halftone dot sizes in accordance with said deviations of said printing characteristics as evidenced by an inking system of the rotary offset printing machine, said adjusting being within predetermined tolerances of said standard desired values of said halftone dot sizes and based on reviewed said printing characteristics of said past productions in order to determine a tolerance sensitivity of the printed original;

controlling halftone dot sizes of the rotary offset printing machine in accordance with said tolerance sensitivity of said printed original;

creating said printing block using said controlled halftone dot sizes, said detecting of said printing characteristics is obtained before said creating of said printing block, and said printing characteristics are determined from previously evidenced printing characteristics of said inking system.

2. A process in accordance with claim 1, further comprising the steps of:

displaying color separation images of a printed original on an image screen of a color simulation computer.

3. A process in accordance with claim 2, wherein:

said controlling of the rotary printing machine is automatic and uses control strategies operating according to inexact logic, such as fuzzy logic.

4. A process in accordance with claim 2, further comprising the step of:

producing said color separation images by a color separation computer.

5. A process in accordance with claim 2, further comprising the steps of:

producing said color separation images by reading in color separated printing blocks of said printed original by means of one of a film and plate scanner.

6. A process in accordance with claim 2, further comprising the steps of:

separating said printed original into a plurality control zones with different deviation sensitivities, said separating being by intended variations of the halftone dot sizes; and determining corresponding set values for the halftone dot sizes for each of said plurality of control zones.

7. A process in accordance with claim 2, further comprising the steps of:

determining the halftone dot size by means of an electronic planimeter analyzing a printed copy.

8. A process in accordance with claim 2, further comprising the step of:

checking contrast by determining a full-tone density of a printed copy, said full-tone density being determined by means of one of a densitometer and/or a spectrophotometer.

9. A process in accordance with claim 2, further comprising the step of:

storing set values for the halftone dot sizes, halftone dot shape, corresponding changes for an inking system calibration and corresponding changes in control actions of the rotary offset printing machine as well as effective setting values; and using said stored values substantially periodically in a self-learning program.

10. A process in accordance with claim 1, wherein:

said detecting of said printing characteristics is performed repetitively from a plurality of said past productions and an average printing characteristic is formed.

11. A process in accordance with claim 10, wherein:

said creating of said controlled halftone dot size includes correcting for anticipated changes in said printing characteristics during production.

12. A process for setting a rotary offset printing machine, the process comprising the steps of:

providing a color separation computer;

separating an original into color separations by color separation computer;

providing a color simulation computer;

transferring said color separations from said color separation computer to said color simulation computer;

providing printing block means for creating a printing block for each of said color separations to reproduce said original;

providing said color simulation computer with tolerance-containing set values;

determining halftone image data for said color separation based on said tolerance containing set values, said determining being performed in said color simulation computer;

providing a scanner means for scanning said printing block means and transferring scanner image data to said color simulation computer from prior print productions;

converting subtractive process colors of said color separation into additive process colors;

displaying a reproduced image and visual reference set values of said original on said color simulation computer;

providing one of a densitometer means and a spectrophotometer means to substantially accurately determine tolerances specific to said printing block means from said prior print productions;

transferring tolerances determined by said one of a densitometer means and a spectrophotometer means to said color simulation computer;

providing planimeter means for scanning individual halftone dots of said reproduced original and transferring halftone size and shape data to said color simulation computer;

comparing said scanner image data, said tolerances determined by said one of a densitometer means and a spectrophotometer means, and said halftone size and shape data, for variations from said original, said comparing being performed in said color simulation computer; and said color simulation computer adjusting said printing block means to create said printing block in a manner to reduce said variations determined from said prior print productions.

* * * * *